Nov. 22, 1955    V. A. ERICKSON ET AL    2,724,318
COMBINATION DEPTH ADJUSTING AND SPRING TENSION DEVICE
Filed April 18, 1951
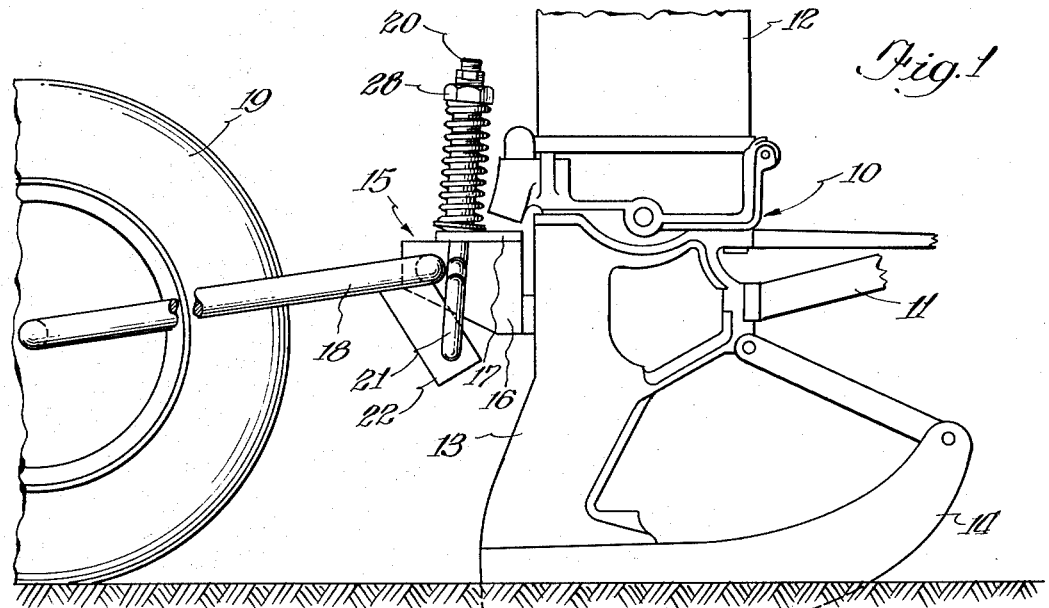
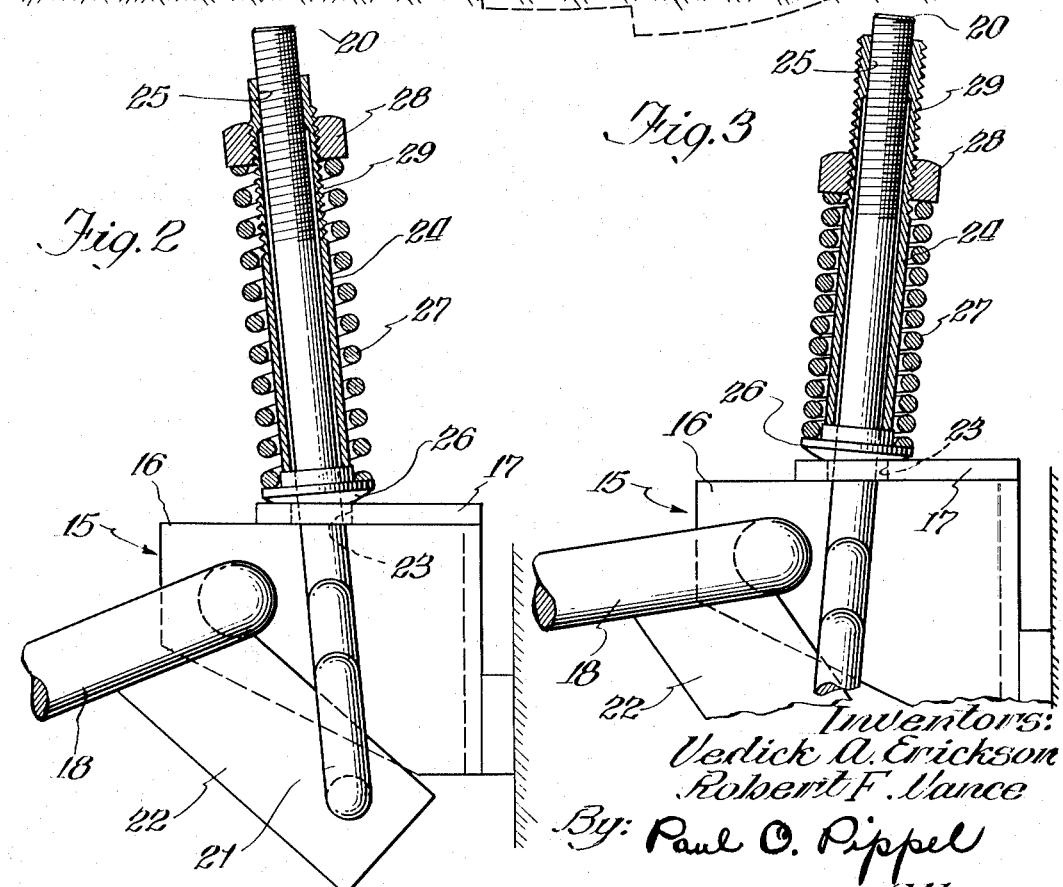
Inventors:
Vedick A. Erickson
Robert F. Vance
By: Paul O. Pippel
Attorney United States Patent Office 2,724,318
Patented Nov. 22, 1955

2,724,318

COMBINATION DEPTH ADJUSTING AND SPRING TENSION DEVICE

Vedick A. Erickson and Robert F. Vance, Richmond, Ind., assignors to International Harvester Company, a corporation of New Jersey Application April 18, 1951, Serial No. 221,706

4 Claims. (Cl. 97—189)

This invention relates to agricultural implements and particularly to planters. More specifically the invention concerns a novel spring-tension hold-down device for the ground engaging wheel of a planter.

An object of the invention is the provision of an improved planter hold-down mechanism for use in conjunction with a ground engaging wheel.

Another object of the invention is the provision of a combination spring-tension and depth-adjusting device for the ground engaging wheel of an implement such as a planter.

Other objects and advantages of the invention will become clear from the following detailed description when read in conjunction with the accompanying drawings, wherein:

Fig. 1 is a view in side elevation of a planter furrow opener unit having a ground engaging wheel associated therewith, adjustable by mechanism embodying the features of this invention;

Fig. 2 is an enlarged sectional elevation of a portion of the structure shown in Fig. 1, with the parts in position for shallow operation of the furrow opener; and Fig. 3 is a sectional view similar to Fig. 2 with the parts in a different position for a deeper penetration of the furrow opener.

The parts of the planter with which this invention is particularly concerned are shown more or less diagrammatically and include a supporting frame 10 and a draft frame 11 by which the implement is propelled over the ground. Preferably the furrow opener unit shown in Fig. 1 is one of a plurality of similar earth working units located at laterally spaced locations on the frame for planting simultaneously a number of rows.

Seed contained in the receptacle 12 is discharged by suitable means forming no part of this invention into a boot 13 having mounted thereupon an elongated upwardly curved runner 14 adapted to open a furrow in the soil for the deposition of seed and the like therein.

Secured to the rear portion of the frame 10 is a bracket 15 having a vertically extending standard portion 16 and a laterally bent flange 17.

The bracket 15 has an opening therein serving as a bearing for the laterally bent forward end of an axle 18 which extends rearwardly and downwardly and has mounted upon its rear end for rotation a wheel 19 which functions as a press wheel to cover the seed deposited in the furrow made by the runner 14 and which also gauges the operating depth of the runner.

From Fig. 1 it will be observed that the axle 18 and the wheel 19 are capable of vertical pivotal movement about the axis of the axle on the bracket 15. Movement of the wheel 19 relative to the furrow opener 14 is controlled by mechanism including a rod or bolt 20, the lower end of which is formed into a hook 21 pivotally received in an opening formed in a lug 22 affixed to and projecting downwardly from the axle 18.

The shank of the bolt 20 is threaded at its upper portion and extends vertically upwardly to be received for sliding movement in an opening 23 formed in the flange 17 of bracket 15. The opening 23 is larger than the shank of the bolt 20 to accommodate pivoting of the bolt in the opening as well as sliding movement thereof relative to the bracket. Surrounding the shank of the bolt 20 above the flange 17 is a sleeve member 24 which has an interior diameter greater than the diameter of the bolt 20 for the greater portion of its length and the upper end of which is constricted as at 25 and interiorly threaded for engagement with the threads of the bolt 20. The sleeve is thus adjustable axially on the bolt by rotation thereof. Rotation of the sleeve is facilitated by the flattening of two sides of the upper end of sleeve 24 as indicated in Fig. 2.

The lower end of sleeve 24 rests against a collar 26 which is slidable on the shank of the bolt 20 and rests upon the upper surface of the flange 17 of bracket 15. The downward movement of the bolt 20 in the opening 23 is therefore limited by abutment of the collar 26 against the flange. As indicated in Figs. 2 and 3, however, the sleeve 24 is readily adjustable on the bolt 20 to vertically swing the wheel 19 and axle 18 relative to the runner 14 to vary the operating depth of the latter.

The wheel 19 is resiliently held in engagement with the ground by spring tension or hold-down means comprising a coil spring 27 surrounding the sleeve 24 and abutting collar 26 at its lower end. In the drawings the sleeve 24 is shown as effectively engaging the flange 17 so that further downward movement of the bolt 20 in opening 23 is prevented, thus serving as a stop to limit the upward swinging of wheel 19 relative to the planter furrow opener 14. In following the contour of the ground, however, wheel 19 may move downwardly from the position shown in the drawings relative to the furrow opener. In this case the sleeve 24 moves away from effective engagement with flange 17. The spring 27 then functions to urge the bolt 20 and axle 18 in a direction to hold the wheel 19 in engagement with the ground. The upper end of the spring 27 abuts a collar in the form of a threaded nut 28 receivable on outside threads 29 formed on the sleeve 24. Adjustment of the collar 28, therefore, as between the positions shown in Figs. 2 and 3 regulates the tension upon the spring 27 and therefore the amount of resistance encountered by the wheel 19 against vertical movement when obstructions are met.

From the foregoing it will be observed that applicants have devised a novel spring tension and hold-down device for use with the ground engaging wheel of a planter or the like which also incorporates means for adjusting the relative vertical positions of the wheel and the planter furrow opener to regulate the depth of operation thereof. It may also be observed that this invention has been described in its preferred embodiment and that modifications may be made therein without departing from the spirit of the invention or the scope of the appended claims.

What is claimed is:

1. A combination depth adjusting and tensioning mechanism for the ground engaging wheel of a planter or the like wherein means serving as an axle is provided upon which the wheel is mounted comprising, in combination with a support to which the axle is pivotally connected for vertical movement relative thereto, a rod member having one end operatively connected to the axle for pivotal movement relative thereto and slidably connected to the support, said rod having is free end threaded, a sleeve on the rod operatively engageable with the support, said sleeve serving as a stop to limit movement of the wheel in one direction relative to the support and being interiorly threaded for engagement with the threaded end of the rod for axial adjustment therealong and having exterior threads thereon, a threaded collar on the sleeve, and a spring surrounding the sleeve between the collar and the support.

2. A combination depth adjusting and tensioning mechanism for the ground engaging wheel of a planter or the like wherein means serving as an axle is provided upon which the wheel is mounted comprising, in combination with a support to which the axle is pivotally connected for vertical movement relative thereto, a generally vertically extending rod having its lower end operatively connected to the axle for pivotal movement relative thereto and extending slidably through an opening in the support, said rod having its free end threaded, a sleeve having one end operatively engaging said support and surrounding the upper portion of said rod, said sleeve serving as a stop to limit movement of the wheel in one direction relative to the support and having a portion interiorly threaded for engagement with the threaded portion of the rod for axial adjustment of the sleeve thereon to vary the extent of movement of the wheel relative to the support, and a portion exteriorly threaded, a nut adjustable on said exteriorly threaded portion of the sleeve, and a spring surrounding the sleeve between the nut and the support.

3. Depth adjusting mechanism for a planter or the like including a tool support, a wheel-carrying axle pivotally mounted on the support for vertical swinging movement, a rod having one end threaded and its other end operatively connected to the axle at a location spaced from the latter's pivot on the support, said support having an opening therein to slidably receive the threaded end of the rod, a sleeve member mounted on the rod having one end operatively engageable with the support and serving as a stop to limit movement of the wheel in one direction relative to the support, said member having interiorly and exteriorly threaded portions, said interiorly threaded portion being engageable with the threaded end of the rod for axial adjustment thereon, a threaded collar receivable on the exteriorly threaded portion of said member, and a pressure spring on the rod between the collar and the support and urging the collar and sleeve away from the support.

4. Depth adjusting mechanism for a planter or the like including a tool support, a wheel-carrying axle pivotally mounted on the support for vertical swinging movement, a rod having one end threaded and its other end operatively connected to the axle at a location spaced from the latter's pivot on the support, said support having an opening therein to slidably receive the threaded end of the rod, a sleeve member mounted on the rod having one end operatively engageable with the support and serving as a stop to limit movement of the wheel in one direction relative to the support, said member having interiorly and exteriorly threaded portions, said interiorly threaded portion being engageable with the threaded end of the rod for axial adjustment thereon, a threaded collar receivable on the exteriorly threaded portion of said member, and a coil spring surrounding the member between the collar and the support, said collar being axially adjustable relative to the sleeve and the rod.

References Cited in the file of this patent

UNITED STATES PATENTS

| | | |
|---|---|---|
| 181,313 | Chase | Aug. 22, 1876 |
| 406,137 | Holeman | July 2, 1889 |
| 530,962 | Packham | Dec. 18, 1894 |
| 1,219,342 | Myers | Mar. 13, 1917 |
| 1,281,873 | Swiggart | Oct. 15, 1918 |
| 1,865,651 | Traphagen | July 5, 1932 |
| 2,109,385 | Garrison et al. | Feb. 22, 1938 |